(12) United States Patent
Nguyen (10) Patent No.: US 9,723,629 B2
(45) Date of Patent: Aug. 1, 2017

(54) WIRELESS COMMUNICATIONS SYSTEM AND METHOD IMPLEMENTED IN A WIRELESS COMMUNICATIONS SYSTEM

(71) Applicant: NEC Corporation, Tokyo (JP)

(72) Inventor: Phong Nguyen, Victoria (AU)

(73) Assignee: NEC CORPORATION, Tokyo (JP)

(*) Notice: Subject to any disclaimer, the term of this patent is extended or adjusted under 35 U.S.C. 154(b) by 88 days.

(21) Appl. No.: 14/426,764

(22) PCT Filed: Feb. 18, 2013

(86) PCT No.: PCT/JP2013/054641
§ 371 (c)(1),
(2) Date: Mar. 9, 2015

(87) PCT Pub. No.: WO2014/038218
PCT Pub. Date: Mar. 13, 2014

(65) Prior Publication Data
US 2015/0245379 A1    Aug. 27, 2015

(30) Foreign Application Priority Data
Sep. 10, 2012  (AU) .................... 2012903941

(51) Int. Cl.
*H04W 4/00* (2009.01)
*H04W 74/00* (2009.01)
(Continued)

(52) U.S. Cl.
CPC ......... *H04W 74/006* (2013.01); *H04L 5/0048* (2013.01); *H04L 5/0091* (2013.01);
(Continued)

(58) Field of Classification Search
None
See application file for complete search history.

(56) References Cited

U.S. PATENT DOCUMENTS 6,167,270 A * 12/2000 Rezaiifar ............... H04B 7/264
370/331
6,954,485 B1 * 10/2005 Hashimoto ........ H04B 1/70756
370/335
(Continued)

FOREIGN PATENT DOCUMENTS

JP     WO 2011086920 A1 *   7/2011  .......... H04J 13/0062
WO        2011086920        7/2011

OTHER PUBLICATIONS

Samsung, "Further discussion on E-PDCCH structure", 3GPP TSG RAN WG1 #68bis R1-121645, Mar. 26, 2012.*
(Continued)

*Primary Examiner* — Chi H Pham
*Assistant Examiner* — Vladislav Agureyev
(74) *Attorney, Agent, or Firm* — Young & Thompson (57) ABSTRACT

There is provided a wireless communications system (1000) including a wireless device (100) and a wireless communications node (300). The wireless communications node (300) transmits in a reference signal sequence to the wireless device (100) a first code sequence (485) and a second code sequence (486). The first code sequence (485) carries information identifying a physical resource block that carries an enhanced physical downlink control channel (ePDCCH) and the second code sequence (486) carries information identifying a control format indicator.

20 Claims, 3 Drawing Sheets

(51) Int. Cl.
*H04W 72/04* (2009.01)
*H04L 5/00* (2006.01)

(52) U.S. Cl.
CPC ........... *H04L 5/0094* (2013.01); *H04W 4/005* (2013.01); *H04W 72/042* (2013.01); *H04L 5/0023* (2013.01); *H04L 5/0051* (2013.01)

(56) References Cited

U.S. PATENT DOCUMENTS

| | | | | |
|---|---|---|---|---|
| 6,965,586 | B1* | 11/2005 | Maruyama | H04B 1/70735 370/335 |
| 2002/0131376 | A1* | 9/2002 | Wheatley, III | H04W 52/24 370/328 |
| 2008/0080560 | A1* | 4/2008 | Inoue | H04L 1/1671 370/491 |
| 2011/0103338 | A1* | 5/2011 | Astely | H04J 11/0069 370/329 |
| 2011/0116455 | A1* | 5/2011 | Damnjanovic | H04L 1/0028 370/329 |
| 2011/0216713 | A1* | 9/2011 | Kim | H04L 5/0053 370/329 |
| 2011/0286436 | A1* | 11/2011 | Suzuki | H04L 1/1692 370/336 |
| 2012/0176885 | A1* | 7/2012 | Lee | H04J 13/0048 370/209 |
| 2012/0287770 | A1* | 11/2012 | Iwai | H04J 13/0062 370/209 |
| 2013/0039188 | A1* | 2/2013 | Larsson | H04L 5/0053 370/241 |
| 2013/0039291 | A1* | 2/2013 | Blankenship | H04L 5/001 370/329 |
| 2013/0083753 | A1* | 4/2013 | Lee | H04W 72/0453 370/329 |
| 2013/0215814 | A1* | 8/2013 | Lee | H04W 56/00 370/312 |
| 2013/0301549 | A1* | 11/2013 | Chen | H04W 76/048 370/329 |
| 2014/0071957 | A1* | 3/2014 | Xu | H04W 52/0219 370/336 |

OTHER PUBLICATIONS

Samsung, "Enhanced PCFICH", 3GPP TSG RAN WG1 #69 R1-122261, May 21, 2012.*
ZTE Corporation, "TP for evaluation/analysis of reduction of maximum bandwidth", 3GPP TSG RAN WG1 Meeting #68 R1-120290, Feb. 6, 2012.*
International Search Report PCT/JP2013/054641 dated Mar. 3, 2013.
Samsung, Further discussion on E-PDCCH structure, 3GPP TSG RAN WG1 #68bis R1-121645, Mar. 26, 2012.
Samsung, Enhanced PCFICH, 3GPP TSG RAN WG1 #69 R1-122261, May 21, 2012.
ZTE Corporation, TP for evaluation/analysis of reduction of maximum bandwidth, 3GPP TSG RAN WG1 Meeting #68 R1-120290, Feb. 6, 2012.

* cited by examiner

WIRELESS COMMUNICATIONS SYSTEM AND METHOD IMPLEMENTED IN A WIRELESS COMMUNICATIONS SYSTEM

TECHNICAL FIELD

The present invention relates to wireless communications system and method implemented in a wireless communications system. In particular although not exclusively the present invention relates to system and methods for the management of machine-type communication (MTC) in a communications network.

BACKGROUND ART

The ever increasing popularity of portable computing devices such as smart phone, tablets etc. has seen a rapid increase in the demand for wireless data services. Most recently the tablet sales alone exceeded 100 million units worldwide. This ever increasing popularity in wireless services has lead to a demand for higher data speeds and quality of service. This demand has seen the evolution of mobile data networks and mobile communication networks in particular. From the introduction of SMS on 2G systems the increasing requirements of data services has seen movement to 2.5G (GSM, GPRS, EGPRS (Edge)) to 3G UTMS, HSPA, HSPA+.

In more recent years the 3GPP realised the Long Term Evolution (LTE) wireless communication standard. The LTE standard promise an all-IP core network with a simplified and flattened architecture that supports higher throughput, lower latency, as well as support for mobility between 3GPP (GSM, UMTS, and LTE) and non-3GPP radio access technologies, including CDMA, WiMAX, WiFi, High Rate Packet Data (HRPD), evolved HRPD (eHRPD), and ETSI-defined TISPAN networks.

The use of a common packet core across multiple access technologies enables mobile service providers to expand their end to end services beyond those currently provided. One area which has seen much interest is Machine to Machine (M2M in ETSI term) communication or Machine Type communication (MTC in 3GPP term) via LTE and LTE Advanced cellular networks. The M2M communications market is a market that is likely to continue to expand in the future due to the rise of applications such as a smart metering, commercial fleet tracking, etc. transmitting and receiving data.

SUMMARY OF INVENTION

Technical Problem

Presently Machine-Type Communications, between MTC devices and between MTC devices & MTC servers in the network, is handled adequately by GSM/GPRS networks. Owing to the low cost of these MTC devices and the good coverage of GSM/GPRS, there has been very little motivation for MTC device suppliers to use modules that support the LTE radio interface. However, as more MTC devices are deployed in the wireless communication network, there will be an increased reliance on the existing GSM/GPRS networks. Thus, this will cost network operators not only in terms of maintaining multiple Radio Access Technologies (RATs) but it will also prevent operators from reaping the maximum benefit out of their licensed spectrum, especially given the non-optimal spectrum efficiency of GSM/GPRS.

Recently 3GPP RAN-WG1 conducted a study on "Provision of Low-Cost MTC UEs based on LTE" and found that the cost LTE UE modem would be comparable to EGPRS modem if a number of criteria are adopted, namely the downlink bandwidth is reduced, peak data rate is reduced, single Rx RF chain is adopted, if downlink transmission modes are reduced, and if half duplex FDD is adopted. Consequently implementation at low cost LTE based MTC devices as a feasible replacement to present 2.5G and 3G MTC devices is possible.

Given that the implementation of low cost MTC device is feasible to permit migration of older MTC systems to new 4G networks the number of MTC devices is likely increase in the future. As such the overall resources they will need for service provision will be significant and thus will need to be efficiently assigned.

Clearly it would be advantageous to provide, a low cost and low power MTC device which has a simple operational procedure to enable low operational cost to MTC operators and which can facilitate migration of MTC devices from the GSM/GPRS networks to LTE networks.

Solution to Problem

Accordingly in one aspect of the present invention there is provided a wireless communications system comprising:
a wireless device; and
a wireless communications node to transmit in a reference signal sequence to the wireless device a first code sequence and a second code sequence,
wherein the first code sequence carries information identifying a physical resource block that carries an enhanced physical downlink control channel (ePDCCH) and the second code sequence carries information identifying a control format indicator.

In one embodiment, the wireless device detects the first and second code sequences from the reference signal to obtain resource allocation based on the ePDCCH and the control format indicator.

In one embodiment, the node comprises a base station.

In one embodiment, the ePDCCH is designated for machine type communications (MTC), and the wireless device comprises a machine type communications device.

In one embodiment, the wireless communication node produces a virtual narrow band within a communication band assigned to the wireless communications node, and the virtual narrow band is designated for MTC.

In one embodiment, the virtual narrow band is in central 1.4 MHz band.

In one embodiment, the first code sequence signifies the number of antenna ports designated by the wireless communications node for the transmission of the ePDCCH.

In one embodiment, the first code sequence comprises a short code and the second code sequence comprises a long code.

In one embodiment, the short code comprises a unique orthogonal sequence which spans 1 physical resource block (PRB) with a length equal to the number of resource elements that are reserved for demodulation reference signals.

In one embodiment, the short code is repeated for one or more PRBs that are allocated for the PDCCH, and the number of short code transmissions is equal to a maximum number of antenna ports intended for ePDCCH(s) transmission.

In one embodiment, the first code sequence is code-multiplexed at least with part of the reference signal sequence by the wireless communications node on a physical resource block basis.

In one embodiment, the long code comprises a unique orthogonal sequence with a length that spans across one or more physical resource blocks in the virtual narrow band.

In one embodiment, a section of the long code is regenerated on a physical resource block basis.

In one embodiment, the long code identifies either control format indicator=1, control format indicator=2 or control format indicator=3.

In one embodiment, the long code for each control format indicator value is unique.

In one aspect of the present invention there is provided a wireless communications node for use in a communications network, the wireless communications node comprising:

a transmitter to transmit in a reference signal sequence to a wireless device a first code sequence and a second code sequence, wherein the first code sequence carries information identifying a physical resource block that carries an enhanced physical downlink control channel (ePDCCH) and the second code sequence carries information identifying a control format indicator.

In one embodiment, the wireless communication node produces a virtual narrow band within a communication band assigned to the wireless communications node, and the virtual narrow band is designated for machine type communications (MTC).

In one embodiment, the virtual narrow band is in central 1.4 MHz band.

In one aspect of the present invention there is provided a wireless device comprising:

a receiving unit to receive in a reference signal sequence from a wireless communications node a first code sequence and a second code sequence, wherein the first code sequence carries information identifying a physical resource block that carries an enhanced physical downlink control channel (ePDCCH) and the second code sequence carries information identifying a control format indicator.

In one aspect of the present invention there is provided a wireless communications node comprising:

a transmitting unit to transmit in a reference signal sequence to a wireless device a first code sequence and a second code sequence, wherein the first code sequence carries information identifying a physical resource block that carries an enhanced physical downlink control channel (ePDCCH) and the second code sequence carries information identifying a control format indicator.

In one aspect of the present invention there is provided a method implemented in a wireless communications system, the method comprising:

transmitting in a reference signal sequence from a wireless communications node to a wireless device a first code sequence and a second code sequence, wherein the first code sequence carries information identifying a physical resource block that carries an enhanced physical downlink control channel (ePDCCH) and the second code sequence carries information identifying a control format indicator.

In one aspect of the present invention there is provided a method implemented in a wireless device, the method comprising:

receiving in a reference signal sequence from a wireless communications node a first code sequence and a second code sequence, wherein the first code sequence carries information identifying a physical resource block that carries an enhanced physical downlink control channel (ePDCCH) and the second code sequence carries information identifying a control format indicator.

In one aspect of the present invention there is provided a method implemented in a wireless communications node, the method comprising:

transmitting in a reference signal sequence to a wireless device a first code sequence and a second code sequence, wherein the first code sequence carries information identifying a physical resource block that carries an enhanced physical downlink control channel (ePDCCH) and the second code sequence carries information identifying a control format indicator.

Accordingly in one aspect of the present invention there is provided a system for enabling Machine Type Communications between Machine Type Device and Machine Type servers and/or applications over a communications network said system comprising:

a plurality of wireless communications nodes coupled to a core network for routing Machine Type Communications data packet(s) received from Machine Type Device within the communications network to Machine Type servers and/or applications wherein each wireless communications node is adapted to:

transmit as part of a reference signal sequence to each Machine Type Device within the nodes coverage area a first code sequence and a second code sequence wherein the first code sequence carries information identify the physical resource block that carry Enhanced Physical Downlink Control Channels (ePDCCHs) designated for Machine Type Communications and wherein the second code sequence carries information identifying Control Format Indicator that indicates the ePDCCHs starting OFDM symbol; and wherein one or more of the Machine Type Devices within the nodes coverage area are adapted to decode the first and second code sequences form the reference signal to obtain their resource allocations and/or the associating PDSCHs from the identified enhanced Physical Downlink Control Channels designated for MTC communications.

Preferably the communications network is an LTE network coupled to the MTC servers and/or MTC applications servers via an external IP network. In such cases the core network may be the LTE network's evolved packet core and the wireless communication nodes are evolved nodeBs. Suitably the wireless communication nodes are adapted to produce a virtual narrow band within the node's assigned communication bands and wherein the virtual narrow band is designated for Machine Type Communications. The virtual band is preferably produced within the central 1.4 MHz band of the LTE spectrum.

The first code sequence(s) may signify an active antenna port for the transmission of the ePDCCHs. Suitably the first code sequence(s) is code-multiplexed with part of the reference signal sequence by wireless communications node on Physical Resource Block basis.

Preferably the first code sequence is a short code and the second code sequence is a long code. Suitably the short code is a unique orthogonal sequence which spans 1 Physical Resource Block (PRB) with a length equal to number of Resource Elements that are reserved for Demodulation Reference Signals. The short codes may be identically repeated for all PRB(s) that are allocated for ePDCCH(s) with the number of transmitted short codes being equal to maximum number of antenna ports intended for ePDCCH(s) transmission. In some embodiments of the invention 1 unique short code may be utilised for single antenna for ePDCCH(s) transmission, 2 unique short codes may be utilised for 2 antennas for ePDCCH(s) transmission and 4 unique short codes may be utilised for single antenna for ePDCCH(s) transmission.

Suitably the long code is a unique orthogonal sequence with a length that spans across all Physical Resource Block in the virtual band. A section of the long code may be regenerated on Physical Resource Block basis. Preferably the long code is a unique orthogonal sequence identifying a Control Format Indicator=1, Control Format Indicator=2 or Control Format Indicator=3. In some embodiments of the invention 3 unique long codes may be utilised for Control Format Indicator=1, Control Format Indicator=2 and Control Format Indicator=3 respectively.

In another aspect of the present invention there is provided a wireless communications node for use in a communications network transmit as part of a reference signal sequence to each Machine Type Device within the nodes coverage area a first code sequence and a second code sequence wherein the first code sequence carries information identify the physical resource block that carry Enhanced Physical Downlink Control Channels (ePDCCHs) designated for Machine Type Communications and wherein the second code sequence carries information identifying Control Format Indicator that indicates the ePDCCHs starting OFDM symbol.

The wireless communications node may be adapted to produce a virtual narrow band within the node's assigned communication bands and wherein the virtual narrow band is designated for Machine Type Communications. The virtual band is preferably produced within the central 1.4 MHz band of the LTE spectrum.

The first code sequence(s) may signify an active antenna port for the transmission of the ePDCCHs. Suitably the first code sequence(s) is code-multiplexed with part of the reference signal sequence by wireless communications node on Physical Resource Block basis.

Preferably the first code sequence is a short code and the second code sequence is a long code. Suitably the short code is a unique orthogonal sequence which spans 1 Physical Resource Block (PRB) with a length equal to number of Resource Elements that are reserved for Demodulation Reference Signals. The short codes may be identically repeated for all PRB(s) that are allocated for ePDCCH(s) with the number of transmitting short codes being equal to maximum number of active antenna ports intended for ePDCCH(s) transmission. In some embodiments of the invention 1 unique short code may be transmitted for single antenna for PDCCH(s) transmission, 2 unique short codes may be transmitted for 2 antennas for PDCCH(s) transmission and 4 unique short codes may be transmitted for single antenna for PDCCH(s) transmission.

Suitably the long code is a unique orthogonal sequence with a length that spans across all Physical Resource Block in the virtual band. A section of the long code may be regenerated on Physical Resource Block basis. Preferably the long code is a unique orthogonal sequence identifying a Control Format Indicator=1, Control Format Indicator=2 or Control Format Indicator=3. In some embodiments of the invention 3 unique long codes may be utilised for Control Format Indicator=1, Control Format Indicator=2 and Control Format Indicator=3 respectively.

In yet another aspect of the present invention there is provided a Machine Type Communication Device for use in a communication network, said Machine Type Communication Device adapted to determine its resource allocations by monitoring reference signal transmissions from a wireless communications node for a first code sequence(s) containing information identify the physical resource block that carry enhanced Physical Downlink Control Channels (ePDCCHs) designated for Machine Type Communications and a second code containing information identifying a Control Format Indicator that indicates the ePDCCHs starting OFDM symbol.

In yet a further aspect of the present invention there is provided a method of enabling Machine Type Communications between Machine Type Communication Devices and Machine Type Communication servers and/or application servers over a communications network including a plurality of wireless communications nodes coupled to a core network for routing Machine Type Communications data packets received/transmitted from/to Machine Type Communication Device within the communications network to Machine Type Communication servers and/or applications servers said method including the steps of:

generating at each wireless communications node a first code sequence(s) containing information identify the physical resource block that carry Enhanced Physical Downlink Control Channels (ePDCCHs) designated for Machine Type Communications and identify number of antenna ports for the transmission of the ePDCCHs;

generating at each wireless communications node a second code sequence containing information identifying a Control Format Indicator;

transmitting from each wireless communications the first code sequences and the second code sequence as part of a reference signal sequence to Machine Type Device within each nodes coverage area;

detecting at each Machine Type Device the first and second code sequences to identify the physical resource block that carry Enhanced Physical Downlink Control Channels (ePDCCHs) and associated number of transmitted antenna ports designated for Machine Type Communications and the Control Format Indicator;

determining at the Machine Type Device the resources allocated to the Machine Type Device from the identified physical resource block that carry Enhanced Physical Downlink Control Channels (ePDCCHs) designated for Machine Type Communications and the Control Format Indicator, whereon the Machine Type Communication Device utilises the assigned resources to communicate with Machine Type servers and/or applications over the network.

The method may also include the steps producing at each wireless a virtual narrow band within the node's assigned communication bands; and designating the virtual narrow band for Machine Type Communications.

Suitably each first code sequence signifies an active antenna port for the transmission of the ePDCCHs. Preferably the first code sequence is a short code. Suitably the short code is a unique orthogonal sequence which spans 1 Physical Resource Block (PRB) with a length equal to number of Resource Elements that are reserved for Demodulation Reference Signals. The short codes may be identically repeated for all PRB(s) that are allocated for ePDCCH(s) with the number of transmitting short codes being equal to maximum number of active antenna ports intended for ePDCCH(s) transmission. In some embodiments of the invention 1 unique short code may be transmitted for single antenna for ePDCCH(s) transmission, 2 unique short codes may be transmitted for 2 antennas for ePDCCH(s) transmission and 4 unique short codes may be transmitted for single antenna for ePDCCH(s) transmission.

Preferably and the second code sequence is a long code. Suitably the long code is a unique orthogonal sequence with a length that spans across all Physical Resource Block in the virtual band. A section of the long code may be regenerated on Physical Resource Block basis. Preferably the long code is a unique orthogonal sequence identifying a Control Format Indicator=1, Control Format Indicator=2 or Control Format Indicator=3. In some embodiments of the invention 3 unique long codes may be utilised for Control Format Indicator=1, Control Format Indicator=2 and Control Format Indicator=3 respectively.

The reference to any prior art in this specification is not, and should not be taken as an acknowledgement or any form of suggestion that the prior art forms part of the common general knowledge.

Advantageous Effects of Invention

According to the present invention, it is possible to be efficiently assigned resources for service provision.

DESCRIPTION OF EMBODIMENTS

In order that this invention may be more readily understood and put into practical effect, reference will now be made to the accompanying drawings, which illustrate preferred embodiments of the invention.

Figure 1:
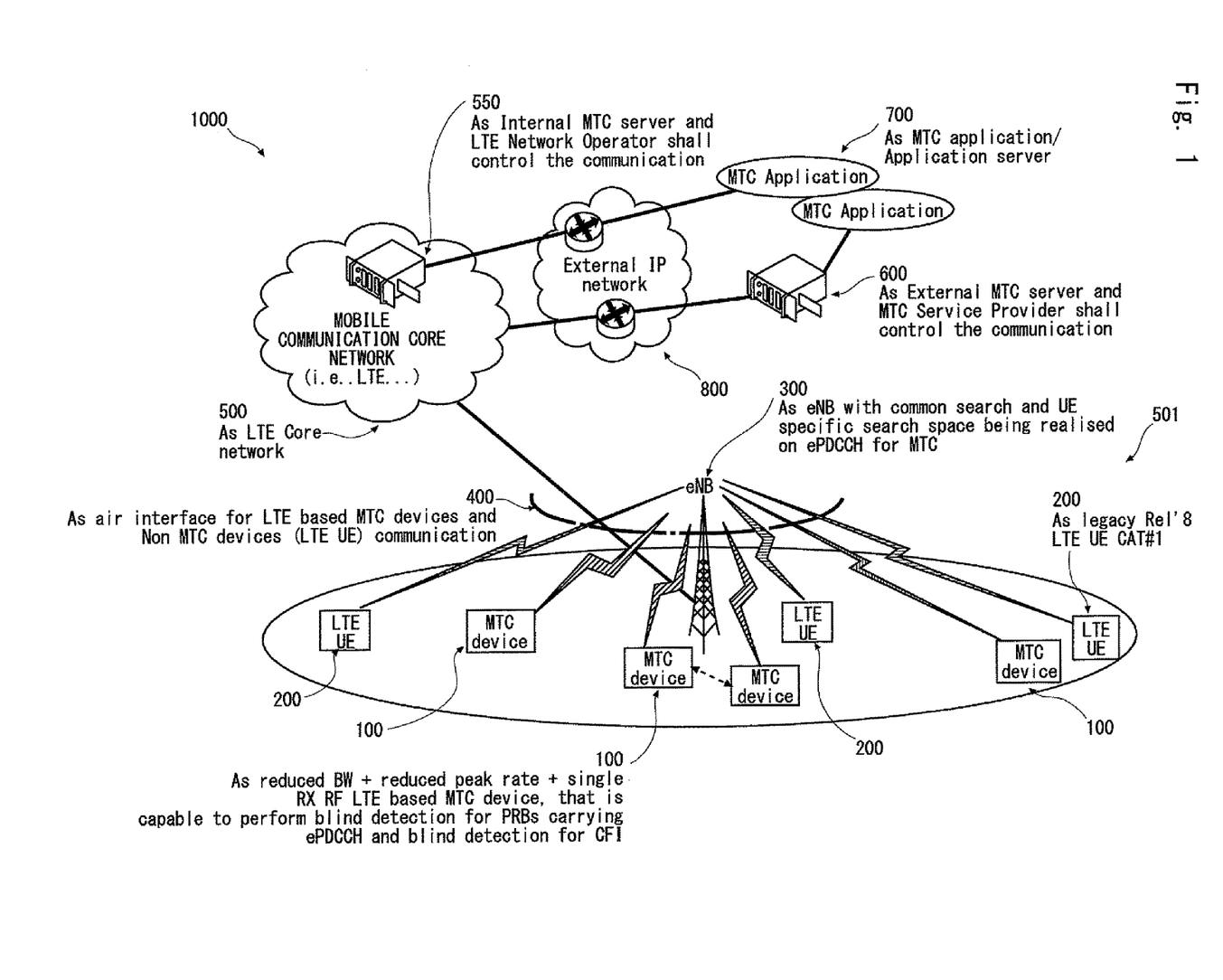
FIG. 1 is a schematic diagram depicting a wireless communication network supporting both legacy devices and low cost MTC devices.

With reference to FIG. 1 there is illustrated a communication network 1000 supporting a number of devices. As shown the network 1000 includes a mobile communications network which is preferably an LTE communications system including mobile communications network core 500 connected to a radio network 501.

The radio network as in the case of most LTE networks includes one or more evolved NodeBs (eNB) 300 which provides wireless connectivity and access to a plurality of wireless terminals to the core network 500 via air interface 400. In this example the eNB 300 supports a plurality of non-MTC devices such as legacy LTE User Equipment (UE) 200 and MTC devices such as low cost LTE based MTC devices 100 for collecting and reporting data over a communication network. Legacy LTE UEs 200 may include wireless devices such as mobile phones, smart phones, laptop computers, etc. used for voice and data communication by human users. An LTE based MTC device 100 has been defined in 3GPP standard as a form of data communication which involved one or more entities that do not necessarily need human interaction and therefore have a specific type of wireless communication network traffic.

As shown in FIG. 1 the communications network core 500 is coupled to an external IP network 800 to provide connectivity with one or more External MTC servers 600 and/or one or more MTC applications/application server(s) 700. In addition to external MTC servers 600 an MTC server 550 may be provided within the core communication network 500 allowing the network operator to control MTC communications with one or more MTC applications/application server(s) 700. The MTC servers 600 or 550 are responsible for the provision MTC communication services to MTC devices 100 such as low cost LTE based MTC device(s). MTC application server 700 is responsible for providing application service(s) to MTC devices such as low cost LTE based MTC device(s).

As will be appreciated by those of skill in the art in LTE the eNB 300 is responsible for the management of radio resources and mobility in the cell and sector to optimize all the UE's communication. The eNB 300 therefore performs ePDCCH's channel coding & multiplexing including DCI formatting, CRC attachment, Channel coding, and rate matching. The eNB also performs ePDCCHs' physical channel processing including Physical channel multiplexing, scrambling, modulation, layer mapping and precoding. In short the eNB is responsible for the Physical Downlink Control Channel (PDCCH) and Enhanced Physical Downlink Control Channel (ePDCCH). Under LTE the PDCCH carries UE-specific scheduling assignments for Downlink (DL) resource allocation, Uplink (UL) grants, Physical Random Access Channel (PRACH) responses, UL power control commands, and common scheduling assignments for signalling messages such as system information, paging, etc.

The PDCCH occupies the first 1 or 2 or 3 OFDM symbols at the beginning of each subframe (except in the case of a 1.4 MHz channel, where it's the first 2 or 3 or 4 OFDM symbols). The actual number of OFDM symbols used to transmit the control information in a subframe is identified by the CFI value. The actual number of OFDM symbols occupied in any given subframe is indicated in the Physical Control Format Indicator Channel (PCFICH), which is located in the first OFDM symbol of each subframe.

The PDCCH has a structure which is composed of a number of blocks the smallest being a Resource Element (RE). A RE is one OFDM symbol in time domain and one subcarrier in frequency domain. The resource elements are grouped into Resource Element Groups (REG). Each REG contains 4 consecutive REs or 4 REs separated by a cell-specific Reference Signal (RS)) within the same OFDM symbol and the same resource block.

The REG are then utilised to form a Control Channel Element (CCE). Each CCE contains 9 REGs, which are distributed across the first 1/2/3 (/4 if needed for a 1.4 MHz channel) OFDM symbols and the system bandwidth through interleaving to enable diversity and to mitigate interference. The number of CCEs in a PDCCH is called its CCE aggregation level, and may be 1, 2, 4, or 8 consecutive CCEs (logical sequence). The total number of available CCEs is determined by the PCFICH configuration and the system bandwidth. Each PDCCH contains exactly one DCI (Downlink Control Information). As the size of the DCI can vary depending on the format and the channel bandwidth, the use of different aggregation levels are allows the PDCCH to accommodate multiple DCI (Downlink Control Information) sizes and formats to improve resource utilisation. by increasing granularity.

Additionally aggregations can be used to differentiate DCIs for control messages and DCIs for UE traffic. Higher aggregation levels can be used for control message resource allocations to provide more protection. The aggregation level for control messages can be 4 or 8, while the aggregation level for UE-specific allocation can be 1 or 2 or 4 or 8.

In order for UEs 200 to determine their resource allocation they must identify the DCI's intended for it. The UE 200 searches for possible resource allocations in the related search space. The search space indicates the set of CCE locations where the UE 200 may find its PDCCHs. Each PDCCH carries one DCI and is identified by a Radio Network Temporary ID (RNTI). The RNTI is implicitly encoded in the CRC attachment of the DCI. There are two types of search space the common search space and the UE-specific search space. A UE 200 is required to monitor both common and UE-specific search space. The common search space includes the DCIs for system information (using the SI-RNTI), paging (P-RNTI), PRACH responses (RA-RNTI), or UL TPC commands (TPC-PUCCH/PUSCH-RNTI). The UE monitors (blindly searches) the common search space using aggregation level 4 and 8.

The UE firstly blindly searches common search space if it is expecting system information (SI-RNTI), paging (P-RNTI), PACH responses (RA-RNTI) and/or uplink TPC command. Once the search of the common space is complete the UE then proceed to blindly search the UE-specific search space. The UE-specific search space can carry DCIs for UE-specific allocations using the UE's assigned C-RNTI, semi-persistent scheduling (SPS C-RNTI), or initial allocation (temporary C-RNTI). The UE monitors the UE-specific search space at all aggregation levels (1, 2, 4, and 8). The starting CCE index of a PDCCH can be obtained using a formula based on the RNTI, the slot number within a radio frame, the total number of CCEs in the control region of a subframe, and the aggregation level.

After each blind detection, the UE 200 checks the CRC with the corresponding RNTI. If CRC succeeds, the UE can derive the exact DCI format of the detected PDCCH from the payload size and RNTI. Knowing the DCI format, the UE can go ahead and parse the payload.

In the case of MTC device resource allocation and access can be handled in a variety of manners depending on the characteristics of the MTC device and its Quality of Service (QoS) requirements. Examples of access control and resource allocation techniques for MTC devices on LTE systems are discussed in the Applicant's earlier filed Australian Provisional applications AU 2011904923 entitled "Apparatus and method of providing machine type communication" and AU 2012900601 entitled "Method of controlling access to a wireless communications network for machine-type communication (MTC) devices" each of which is herein incorporated by reference in their entirety.

In addition to factors such as the characteristics of the MTC device and it's required QoS the 3GPP as a result of the RAN-WG1 study has specified a Bill of Material (BOM) for the provision of low-cost MTC UEs based on LTE. According to 3GPP RAN-WG1 in order for low cost MTC device on LTE to be comparable with current EGPRS services downlink bandwidth must be reduced, peak data rate must be reduced with TBS restricted to 1000 bits, single Rx RF chain be adopted, if downlink transmission modes are reduced, and if half duplex FDD is adopted. As the result of the study on provision of low-cost MTC UEs based on LTE, 3GPP RAN-WG1 has recommended that:

1. peak rate reduction and bandwidth reduction are adopted as mandatory techniques,
2. Half duplex FDD is adopted as optional techniques,
3. Single receive RF chain is adopted only if the coverage reduction should be entirely compensated, and
4. MTC-specific UE category is introduced Accordingly in order to meet the BOM low cost LTE based MTC devices 100 must adopt BW reduction plus peak rate reduction and single Rx RF chain. The RAN-WG1 study in considering bandwidth reduction examined a number options including reduced bandwidth for baseband only for both data channel and control channels (DL-2) and reduced bandwidth for data channel in baseband only while control channels are still allowed to use the carrier bandwidth (DL-3). Both these options demonstrate high potential due to cost reduction factor as well as degree of legacy specification changes required. Implementation of the DL-2 option with minimal LTE specification change poses a number of technical challenges.

To enable the provision of low cost MTC devices on LTE with minimal impact on core LTE services the applicant in their earlier provisional application AU 2012900601 proposed the use designated spectrum within normal LTE operation considered too small for normal LTE operations. Under the system proposed in AU 2012900601 the central 1.4 MHz was configured as a virtual narrow bandwidth (BW) allocated to MTC traffic. In order to implement the 3GGP Bill of Material for MTC on LTE the virtual narrow bandwidth is again utilised. However, in order to realise the DL-2 option the use of common and UE specific search space on ePDCCH for MTC devices must also to be realised. To facilitate common and UE specific search space for MTC devices the present invention utilises Short Codes (SC) and Long Codes (LC) which are mapped by the eNB to resources elements (REs) within physical resource blocks (PRB) being reserved for MTC ePDCCHs. The low cost MTC device 100 then perform blind detection of the short and long codes to identify PRB(s) that carry ePDCCH(s) for MTC transmission.

The Short Codes (SC) that are used to assist MTC devices in blind detection of ePDCCH's PRBs and ePDCCH's number of transmit antenna ports are code-multiplexed by eNB with a part of the reference signal sequence on PRB basis. The Long Code(s) used by eNB on top of the Short Codes in code-multiplexing or scrambling are to enable MTC devices to detect the CFI (i.e. legacy control region) hence the starting OFDM symbol on the detected PRBs that carry ePDCCH(s) for MTC transmission.

Each short code is a unique orthogonal sequence shall which span for 1 PBR with a length equal to number of Resource Elements that are reserved for UE specific reference signal (also called as DMRS: Demodulation Reference Signal) mapping on designated antenna port, in PRB assigned for the corresponding MTC ePDCCH transmission. In the case of the Long Code 3 unique orthogonal sequences are used to identify CFI=1, CFI=2 and CFI=3.

To effect transmission of the Short and Long codes the eNB performs on designated antenna port(s), in physical resource block (PRB) with frequency domain index $n_{PRB}$ assigned for MTC ePDCCH transmission a mapping of ePDCCH or ePDCCHs to Resource Elements (REs) that are not used for transmission of PBCH, synchronization signals, cell-specific reference signals, MBSFN reference signals or UE-specific reference signals. The eNB also performs on designated antenna port(s), in physical resource block (PRB) with frequency domain index $n_{PRB}$ assigned for the corresponding MTC ePDCCH transmission, a mapping of a part of the reference signal sequence that has been code-multiplexed with the Short Code and part of the Long Code to resources elements (REs) being reserved for UE-specific reference signals.

Figure 2:
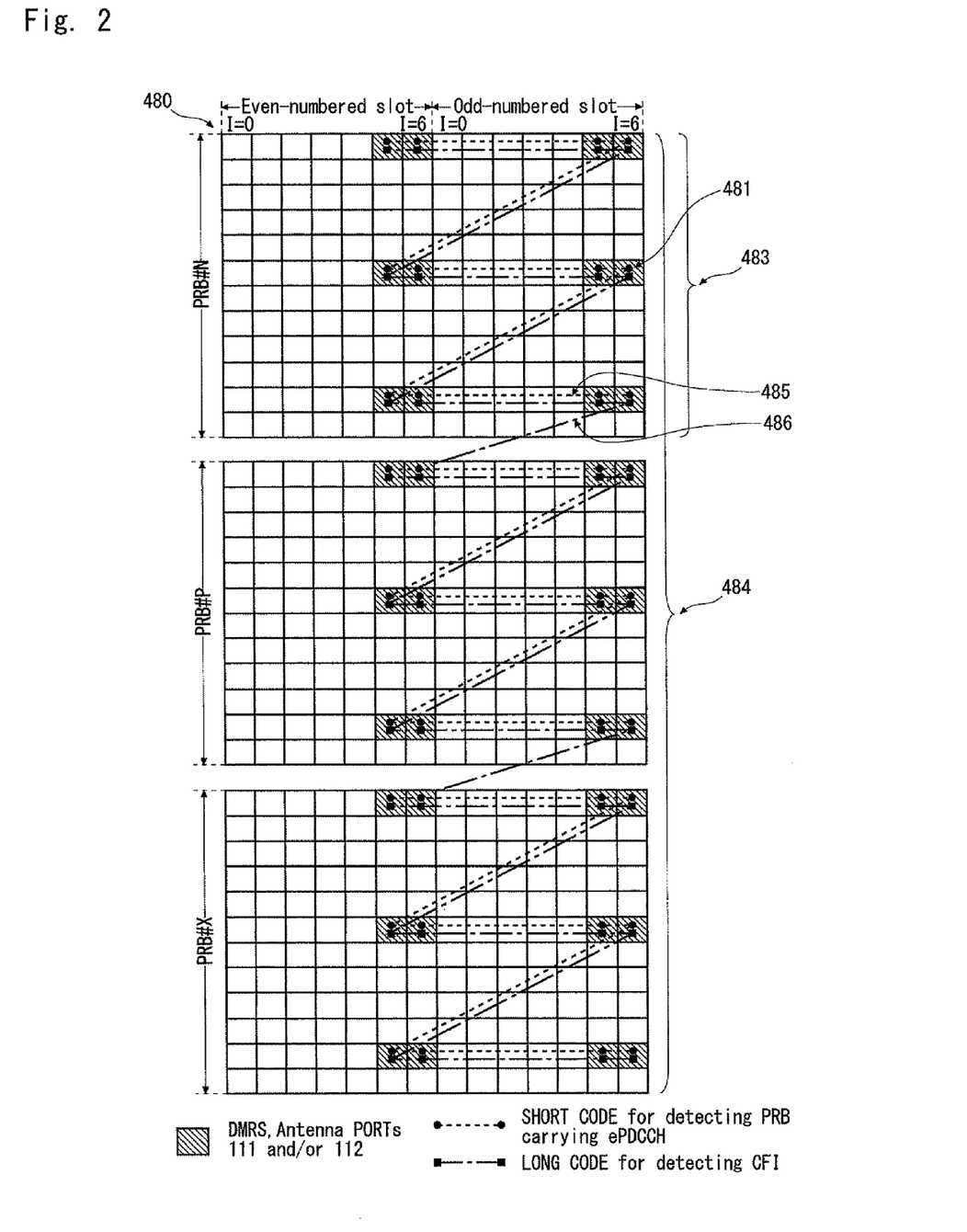
FIG. 2 is a schematic diagram depicting the orthogonal sequences and Resource Element (RE) mapping for blind detection of Physical Recourse Blocks carrying MTC ePDCCH and blind detection of CFI for 1 and 2 antenna ports.

FIG. 2 illustrates the use of Short Codes 485 and Long Codes 486 for the case of 1 or 2 antenna ports 111, 112 being used for ePDCCH(s) transmission. As shown the Short Code (SC) 486 is multiplexed with a part reference signal sequence on PRB basis 483 and mapped on UE specific reference signal RE(s) 481 antenna port 111 and/or antenna port 112 being used for ePDCCH transmission. Each Short Code is mapped on DMRS RE(s) first in time and then in frequency to maximise both time and frequency diversity.

As can be seen from FIG. 2 the Short Code is length 12. As can be seen from FIG. 2 the orthogonal sequence(s) used as Short Code(s) are identically repeated for all PRB(s) that are allocated for ePDCCH(s) with the number of unique orthogonal sequences used as Short Codes being equal to maximum number of antenna ports intended for ePDCCH(s) transmission. In the case of FIG. 2 antenna ports 111 and/or antenna port 112 are/is used to transmit ePDCCH(s) 2 unique orthogonal sequences are utilised for the Short Codes.

For the case of 1 or 2 antenna ports being used for ePDCCH(s) transmission as shown in FIG. 2, only 1 unique orthogonal sequence is utilised as the Long Code (LC). The length of the orthogonal sequence used as the Long Code spans across all PRBs for entire reduced bandwidth $[N_{RB}^{ReducedBW}]$. For the case of reduced Bandwidth is 1.4 MHz, and number of RE(s) reserved for DMRS is 12, the length of the Long Code is therefore [12×6]. This is to enable a replica of a section of the Long Code to be regenerated on PRB basis. Part or multiple parts of the Long Code may be used when number of PRB(s) allocated for ePDCCH(s) is less than $N_{RB}^{ReducedBW}$. The length of a Long Code can be optionally reduced by repeating the same Long Code on a predefined block of consecutive PRBs (so call Physical Resource Block Group (PRBG)) basis.

Figure 3:
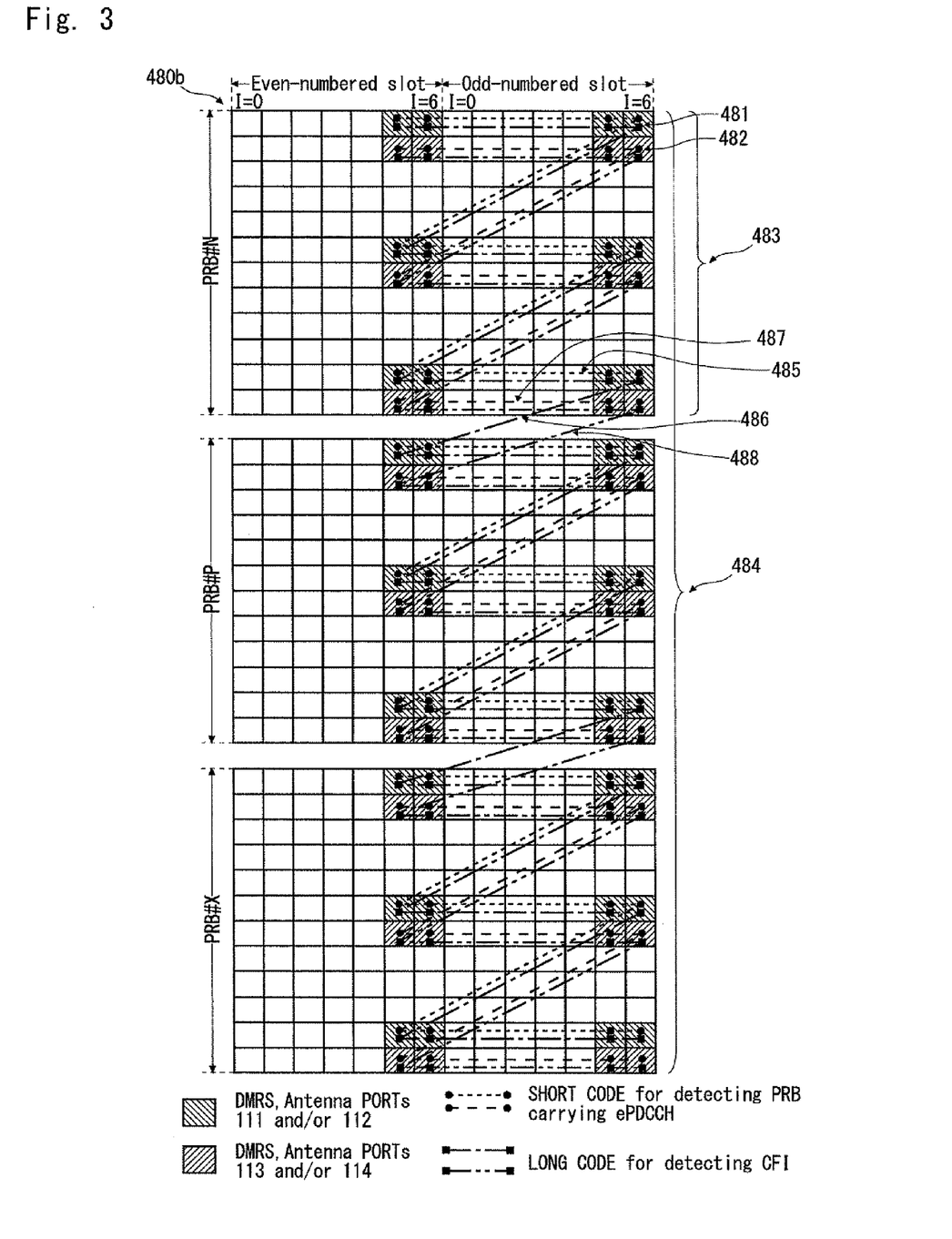
FIG. 3 is a schematic diagram depicting the orthogonal sequences and Resource Element (RE) mapping for blind detection of Physical Recourse Blocks for carrying MTC ePDCCH and blind detection of CFI for 4 antenna ports.

While FIG. 2 depicts the use of Short and Long codes for 1 and 2 antenna ports LTE Rel'11 4 antenna ports are provides. FIG. 3 illustrates the use of Short Codes 485, 487 and Long Codes 486, 488. As shown in case of where the 4 antenna ports 111, 112, 113 and 114 are used to transmit ePDCCH(s) 4 unique orthogonal sequences are utilised. As in the example depicted in FIG. 2 the Short Codes depicted in FIG. 3 are again 12 in length and are multiplexed with a part reference signal sequence on PRB basis 483 and mapped on UE specific reference signal RE(s) 481 and 482 for antenna ports 111, 112, 113 and 114 respectively, with each Short Code mapped on DMRS RE(s) first in time and then in frequency to maximise both time and frequency diversity.

To improve CFI detection in the case where 4 antenna ports are utilised the for ePDCCH(s) transmission, 2 identical orthogonal sequence used as Long Codes 486, 488. As noted above the length of the orthogonal sequence used as the LC spans across all PRBs for entire reduced bandwidth $[N_{RB}^{ReducedBW}]$.

To identify PRB(s) within the defined reduce bandwidth that carry ePDCCH(s) number of antenna port(s) that is used for MTC ePDCCH transmission, the MTC device 100 detects PRBs that carry MTC's ePDCCHs and number of ePDCCH's transmit antenna ports using the short codes. The MTC device then performs CFI detection on the detected PRBs using the long code in order to determine the starting OFDM symbol of ePDCCHs. With detected PRBs, number of transmit antenna port and ePDCCHs starting OFDM symbol, the MTC device is able to collect all RE(s) carrying ePDCCHs to form total search space and then perform a common search or UE specific search or both to detect control information (DCI) intended for it in similar manner to that discussed above for the legacy LTE devices.

By utilising the Short and Long Codes the MTC device is able to blindly identify the PRBs that carry ePDCCH(s) for MTC, the number of antenna port(s) that are used for the transmission of ePDCCH(s) and CFI without impact on existing LTE infrastructure. Additionally as the MTC only has to extract the Short and Long Codes, little modification is required to existing MTC architecture to utilise LTE services making the introduction of a low cost LTE base MTC device feasible.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

This application is based upon and claims the benefit of priority from Australian Patent Application No. 2012903941, filed on Sep. 10, 2012, the disclosure of which is incorporated herein in its entirety by reference.

REFERENCE SIGNS LIST

100 MTC DEVICE
111-114 ANTENNA PORT
200 LTE USER EQUIPMENT (UE)
300 EVOLVED NODEB (eNB)
400 AIR INTERFACE
481, 482 UE SPECIFIC REFERENCE SIGNAL RE
483 PRB BASIS
485, 487 SHORT CODE
486, 488 LONG CODE
500 MOBILE COMMUNICATION CORE NETWORK
501 RADIO NETWORK
550 MTC SERVER
600 EXTERNAL MTC SERVER
700 MTC APPLICATION/APPLICATION SERVER
800 EXTERNAL IP NETWORK
1000 COMMUNICATION NETWORK

The invention claimed is:
1. A wireless communications system comprising:
a wireless device; and
a wireless communications node to transmit in a reference signal sequence to the wireless device a first code sequence and a second code sequence,
wherein the first code sequence carries information identifying a physical resource block that carries an enhanced physical downlink control channel (ePDCCH) and the second code sequence carries information identifying a control format indicator,
wherein the first code sequence signifies the number of antenna ports designated by the wireless communications node for the transmission of the ePDCCH,
wherein the first code sequence comprises a short code and the second code sequence comprises a long code, and
wherein the wireless device detects the first and second code sequences from the reference signal to obtain resource allocation based on the ePDCCH and the control format indicator.
2. The wireless communications system of claim 1, wherein the node comprises a base station.

3. The wireless communications system of claim 1,
wherein the ePDCCH is designated for machine type communications (MTC), and
wherein the wireless device comprises a machine type communications device.

4. The wireless communications system of claim 3,
wherein the wireless communication node produces a virtual narrow band within a communication band assigned to the wireless communications node, and
wherein the virtual narrow band is designated for MTC.

5. The wireless communications system of claim 4, wherein the virtual narrow band is in central 1.4 MHz band.

6. The wireless communications system of claim 1, wherein the short code comprises a unique orthogonal sequence which spans 1 physical resource block (PRB) with a length equal to the number of resource elements that are reserved for demodulation reference signals.

7. The wireless communications system of claim 6,
wherein the short code is repeated for one or more PRBs that are allocated for the PDCCH, and
wherein the number of short code transmissions is equal to a maximum number of antenna ports intended for ePDCCH(s) transmission.

8. The wireless communications system of claim 1, wherein the first code sequence is code-multiplexed at least with part of the reference signal sequence by the wireless communications node on a physical resource block basis.

9. The wireless communications system of claim 1, wherein the long code comprises a unique orthogonal sequence with a length that spans across one or more physical resource blocks in the virtual narrow band.

10. The wireless communications system of claim 9, wherein a section of the long code is regenerated on a physical resource block basis.

11. The wireless communications system of claim 9, wherein the long code identifies either control format indicator=1, control format indicator=2 or control format indicator=3.

12. The wireless communications system of claim 11, wherein the long code for each control format indicator value is unique.

13. A wireless communications node for use in a communications network, the wireless communications node comprising:
a transmitter to transmit in a reference signal sequence to a wireless device a first code sequence and a second code sequence,
wherein the first code sequence carries information identifying a physical resource block that carries an enhanced physical downlink control channel (ePDCCH) and the second code sequence carries information identifying a control format indicator,
wherein the first code sequence signifies the number of antenna ports designated by the wireless communications node for the transmission of the ePDCCH,
wherein the first code sequence comprises a short code and the second code sequence comprises a long code, and
wherein the wireless device detects the first and second code sequences from the reference signal to obtain resource allocation based on the ePDCCH and the control format indicator.

14. The wireless communications node of claim 13,
wherein the wireless communication node produces a virtual narrow band within a communication band assigned to the wireless communications node, and
wherein the virtual narrow band is designated for machine type communications (MTC).

15. The wireless communications node of claim 14, wherein the virtual narrow band is in central 1.4 MHz band.

16. A wireless device comprising:
a receiving unit to receive in a reference signal sequence from a wireless communications node a first code sequence and a second code sequence,
wherein the first code sequence carries information identifying a physical resource block that carries an enhanced physical downlink control channel (ePDCCH) and the second code sequence carries information identifying a control format indicator,
wherein the first code sequence signifies the number of antenna ports designated by the wireless communications node for the transmission of the ePDCCH,
wherein the first code sequence comprises a short code and the second code sequence comprises a long code, and
wherein the wireless device detects the first and second code sequences from the reference signal to obtain resource allocation based on the ePDCCH and the control format indicator.

17. A wireless communications node comprising:
a transmitting unit to transmit in a reference signal sequence to a wireless device a first code sequence and a second code sequence,
wherein the first code sequence carries information identifying a physical resource block that carries an enhanced physical downlink control channel (ePDCCH) and the second code sequence carries information identifying a control format indicator,
wherein the first code sequence signifies the number of antenna ports designated by the wireless communications node for the transmission of the ePDCCH,
wherein the first code sequence comprises a short code and the second code sequence comprises a long code, and
wherein the wireless device detects the first and second code sequences from the reference signal to obtain resource allocation based on the ePDCCH and the control format indicator.

18. A method implemented in a wireless communications system, the method comprising:
transmitting in a reference signal sequence from a wireless communications node to a wireless device a first code sequence and a second code sequence,
wherein the first code sequence carries information identifying a physical resource block that carries an enhanced physical downlink control channel (ePDCCH) and the second code sequence carries information identifying a control format indicator,
wherein the first code sequence signifies the number of antenna ports designated by the wireless communications node for the transmission of the ePDCCH,
wherein the first code sequence comprises a short code and the second code sequence comprises a long code, and
wherein the wireless device detects the first and second code sequences from the reference signal to obtain resource allocation based on the ePDCCH and the control format indicator.

19. A method implemented in a wireless device, the method comprising:
receiving in a reference signal sequence from a wireless communications node a first code sequence and a second code sequence, wherein the first code sequence carries information identifying a physical resource block that carries an enhanced physical downlink control channel (ePDCCH) and the second code sequence carries information identifying a control format indicator, wherein the first code sequence signifies the number of antenna ports designated by the wireless communications node for the transmission of the ePDCCH, wherein the first code sequence comprises a short code and the second code sequence comprises a long code, and wherein the wireless device detects the first and second code sequences from the reference signal to obtain resource allocation based on the ePDCCH and the control format indicator.

20. A method implemented in a wireless communications node, the method comprising:

transmitting in a reference signal sequence to a wireless device a first code sequence and a second code sequence, wherein the first code sequence carries information identifying a physical resource block that carries an enhanced physical downlink control channel (ePDCCH) and the second code sequence carries information identifying a control format indicator, wherein the first code sequence signifies the number of antenna ports designated by the wireless communications node for the transmission of the ePDCCH, wherein the first code sequence comprises a short code and the second code sequence comprises a long code, and wherein the wireless device detects the first and second code sequences from the reference signal to obtain resource allocation based on the ePDCCH and the control format indicator.

* * * * *